US012554220B2

(12) United States Patent
Ohsugi

(10) Patent No.: US 12,554,220 B2
(45) Date of Patent: Feb. 17, 2026

(54) IMAGE FORMING APPARATUS

(71) Applicant: SHARP KABUSHIKI KAISHA, Osaka (JP)

(72) Inventor: Jitsui Ohsugi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/976,546

(22) Filed: Dec. 11, 2024

(65) Prior Publication Data

US 2025/0208558 A1 Jun. 26, 2025

(30) Foreign Application Priority Data

Dec. 25, 2023 (JP) ................................ 2023-218241

(51) Int. Cl.
*G03G 15/00* (2006.01)
*G03G 21/16* (2006.01)

(52) U.S. Cl.
CPC ..... *G03G 15/6508* (2013.01); *G03G 15/5016* (2013.01); *G03G 15/5029* (2013.01); *G03G 21/1685* (2013.01); *G03G 2215/00734* (2013.01)

(58) Field of Classification Search
CPC ........... G03G 15/5016; G03G 15/5029; G03G 15/6508; G03G 21/1685; G03G 15/00734
See application file for complete search history.

(56) References Cited

U.S. PATENT DOCUMENTS

2006/0062610 A1* 3/2006 Ito ...................... G03G 15/2042 399/328
2015/0346654 A1* 12/2015 Saito .................. G03G 15/5016 399/33
2015/0346655 A1* 12/2015 Hirayama .......... G03G 21/1685 399/33
2016/0026138 A1 1/2016 Hikichi et al.
2021/0405567 A1* 12/2021 Takayama .......... G03G 15/2064

FOREIGN PATENT DOCUMENTS

JP 2015-225283 A 12/2015
JP 2016-033643 A 3/2016

* cited by examiner

*Primary Examiner* — David H Banh
(74) *Attorney, Agent, or Firm* — ScienBiziP, P.C.

(57) ABSTRACT

An image forming apparatus includes an image former, a plurality of trays, a paper size setter, a display, and one or more controllers. The image former forms an image on paper by heating and fixing a toner onto the paper using a replaceable fixing unit detachably mounted therein. The image former includes a fixing unit detector. Upon the fixing unit detector detecting mounting of the fixing unit, the controller acquires a paper width that is manageable for printing by the fixing unit and compares the acquired paper width with paper sizes of paper contained in the plurality of trays received by the paper size setter. If at least one of the plurality of trays contains paper of a paper size that is not suitable for printing by the fixing unit, the controller causes the display to display a message or an indication indicating this issue.

6 Claims, 10 Drawing Sheets

IMAGE FORMING APPARATUS

BACKGROUND OF THE INVENTION

Field of the Invention

The present disclosure relates to an image forming apparatus, and more particularly, to an image forming apparatus that forms an image on paper by heating and fixing a toner onto the paper using a replaceable fixing unit detachably mounted therein.

Description of the Background Art

In general, image forming apparatuses such as copiers having a duplicator function (copy function) like printers and multifunction peripherals (MFPs) having multiple functions including a duplicator function are capable of performing printing and containing paper of different sizes and different types in different trays in a paper feeder.

It is known that some issues can arise in a case where an image forming apparatus such as described above performs continuous printing on a large number of sheets of thick paper of the same size. That is, edges of the paper sheets can cause scratches (edge-induced scratches) on a surface of a fixing roller of the image forming apparatus due to the passage of the paper. Furthermore, a step can form at a boundary between a portion of the surface of the fixing roller where the paper passes and a portion therearound, resulting in an image defect.

One method for preventing an image defect due to scratches on the surface of the fixing roller that can be caused by paper sheet edges is to employ fixing units that are respectively designed to manage different paper widths for printing and replace fixing units as appropriate to perform printing. Operator replaceable units (ORUs) for fixing are known as an example of this type of fixing units that are replaced by a user.

Each fixing unit that is mounted as an ORU for fixing is designed to manage a different paper size for printing. That is, the user needs to replace fixing units to perform printing on paper of different sizes.

If the user fails to replace a fixing unit and proceeds with printing on paper of a size that is not suitable for the fixing unit, therefore, this can result in scratches on the fixing roller due to paper sheet edges and cause an image defect.

In order to prevent such scratches due to paper sheet edges and image defects, a known conventional technology prevents a wrong setting leading to a disagreement between the paper width that is manageable for printing by a fixing unit and the paper width in a main body of an image forming apparatus by storing paper widths that are manageable for printing by fixing units and controlling the paper width that can be set among the paper widths that are manageable for printing by the fixing units when a fixing unit is mounted in the main body.

Another known technology prevents an inappropriate user operation by making only a tray containing paper usable for printing available for printing.

However, the method involving storing paper widths that are manageable for printing by fixing units and controlling the paper width that can be set among the paper widths that are manageable for printing by the fixing units when a fixing unit is mounted in the main body still involves the possibility of printing being performed using a paper width that is not manageable for printing by the mounted fixing unit due to, for example, forced tray switching through a tray specifying job or a stop job indicated by an inappropriate user operation, causing edge-induced scratches on the fixing unit.

Furthermore, the method involving preventing an inappropriate user operation by making only a tray containing paper usable for printing available for printing does not allow the user to use the image forming apparatus until the fixing unit replacement is completed even in a situation where there is no replacement fixing unit available or the user has no time to replace the fixing unit, and the user wishes to proceed with printing on a few sheets having a paper width larger than the paper width that is manageable for printing by the fixing unit, accepting the possibility of an image defect.

The present disclosure was achieved in consideration of the above-described circumstances, and an object thereof is to provide an image forming apparatus that prevents, following replacement of a fixing unit, scratches on the fixing unit due to paper sheet edges and image defects, which can occur in a case where printing is performed on paper of an inappropriate paper size, more adequately than before.

SUMMARY OF THE INVENTION

An image forming apparatus according to the present disclosure includes: an image former that forms an image on paper by heating and fixing a toner onto the paper using a replaceable fixing unit detachably mounted therein, the image former including a fixing unit detector that detects mounting of the fixing unit and a paper width that is manageable for printing by the fixing unit; a paper feeder including a plurality of trays into which paper of predetermined different paper sizes are loaded; a paper size setter that receives a setting of the paper size for the paper contained in each of the plurality of trays; a display that displays various types of information to a user; and one or more controllers that control the image former, the paper feeder, the paper size setter, and the display. Upon the fixing unit detector detecting the mounting of the fixing unit, the controllers acquire a paper width that is manageable for printing by the fixing unit and compare the acquired paper width with the paper sizes of the paper contained in the plurality of trays received by the paper size setter. If at least one of the plurality of trays contains paper of a paper size that is not suitable for printing by the fixing unit, the controllers cause the display to display a message or an indication indicating this issue.

According to the present disclosure, upon the fixing unit detector detecting the mounting of the fixing unit, the controllers acquire a paper width that is manageable for printing by the fixing unit and compare the acquired paper width with the paper sizes of the paper contained in the plurality of trays received by the paper size setter. If at least one of the plurality of trays contains paper of a paper size that is not suitable for printing by the fixing unit, the controllers cause the display to display a message or an indication indicating this issue. This configuration makes it possible to achieve an image forming apparatus that prevents, following replacement of a fixing unit, scratches on the fixing unit due to paper sheet edges and image defects, which can occur in a case where printing is performed using an inappropriate paper size, more adequately than before.

DESCRIPTION OF THE PREFERRED EMBODIMENTS

Figure 1:
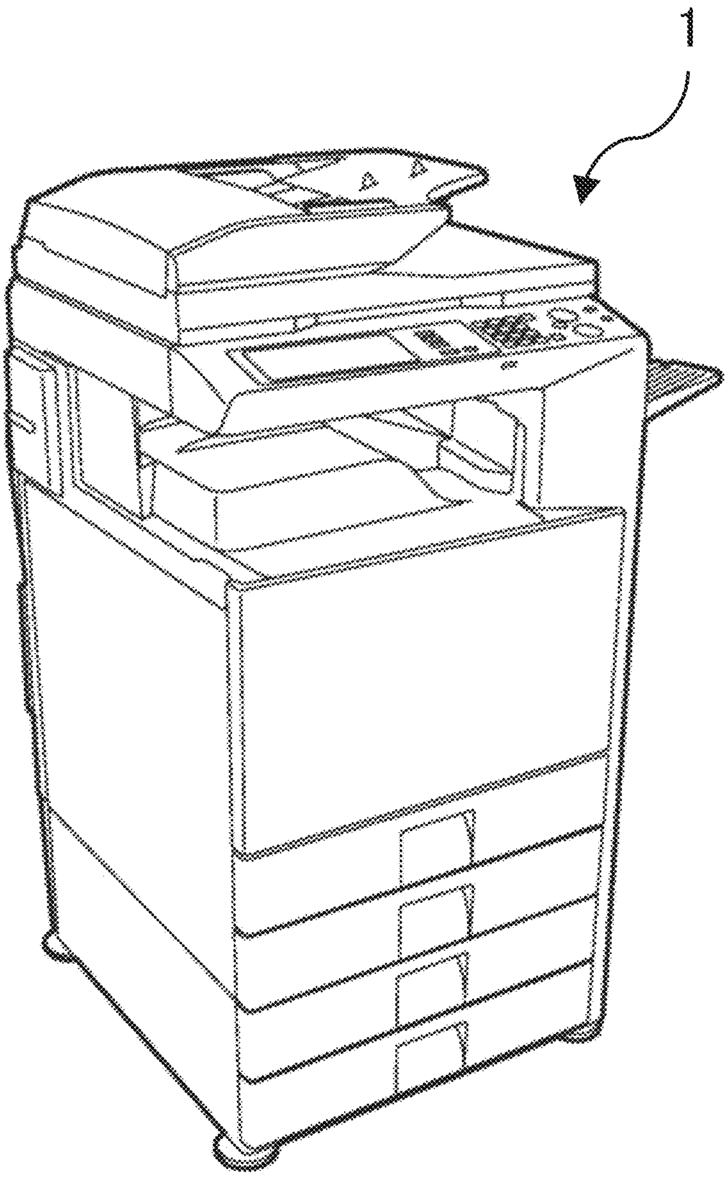
FIG. 1 is a perspective view of the exterior of a digital multifunction machine according to a first embodiment of the present disclosure.

In the present disclosure, the "image forming apparatus" refers to, for example, an apparatus that forms and outputs images, such as a copier having a duplicator function (copy function) like a printer adopting an electrophotographic method for image formation using toners and a multifunction peripheral (MFP) having multiple functions including a duplicator function. What is referred to as "a message or an indication indicating this issue" may be, for example, changing the color of an icon displayed for a relevant tray as well as displaying a warning message.

The "paper sizes of the paper contained in the plurality of trays received by the paper size setter" are not limited to the paper sizes of the paper contained in the trays received by the paper size setter and may be, for example, the paper sizes of the paper contained in the trays detected by a paper size detection sensor.

The following further describes preferred embodiments of the present disclosure.

In the image forming apparatus according to the present disclosure, if at least one of the plurality of trays contains paper of a paper size smaller than the paper width that is manageable for printing by the fixing unit, the controllers may cause the display to display a message or an indication requesting a change of the paper in the at least one tray.

This configuration makes it possible to achieve an image forming apparatus that prevents, following replacement of a fixing unit, scratches on the fixing unit due to paper sheet edges, which can occur in a case where printing is performed using a paper size smaller than the paper width that is manageable for printing by the fixing unit, more adequately than before.

In the image forming apparatus according to the present disclosure, if at least one of the plurality of trays contains paper of a paper size larger than the paper width that is manageable for printing by the fixing unit, the controllers may cause the display to display a message or an indication indicating the possibility of an image defect occurring in image formation on the paper contained in the at least one tray.

This configuration makes it possible to achieve an image forming apparatus that prevents, following replacement of a fixing unit, image defects, which can occur in a case where printing is performed using a paper size larger than the paper width that is manageable for printing by the fixing unit, more adequately than before.

In the image forming apparatus according to the present disclosure, upon the paper size setter receiving a setting to change the paper size of the paper contained in one of the plurality of trays, the controllers may acquire the paper width that is manageable for printing by the fixing unit and compare the acquired paper width with a new paper size to change to, and if the new paper size is not suitable for printing by the fixing unit, cause the display to display a message or an indication indicating this issue.

This configuration makes it possible to achieve an image forming apparatus that prevents, following a paper size change, scratches on the fixing unit due to paper sheet edges and image defects, which can occur in a case where printing is performed using an inappropriate paper size, more adequately than before.

In the image forming apparatus according to the present disclosure, if the new paper size is smaller than the paper width that is manageable for printing by the fixing unit, the controllers may cause the display to display a message or an indication indicating that the paper size is not changeable to the new paper size.

This configuration makes it possible to achieve an image forming apparatus that prevents, following a paper size change, scratches on the fixing unit due to paper sheet edges, which can occur in a case where printing is performed using a paper size smaller than the paper width that is manageable for printing by the fixing unit, more adequately than before.

In the image forming apparatus according to the present disclosure, if the new paper size is larger than the paper width that is manageable for printing by the fixing unit, the controllers may cause the display to display a message or an indication indicating the possibility of an image defect occurring in image formation on the paper of the new paper size.

This configuration makes it possible to achieve an image forming apparatus that prevents, following a paper size change, image defects, which can occur in a case where printing is performed using a paper size larger than the paper width that is manageable for printing by the fixing unit, more adequately than before.

The following describes the present disclosure in further detail with reference to the accompanying drawings. The description given below are exemplary in all aspects, and are not intended to be construed as a basis of limiting the present disclosure.

First Embodiment

Schematic Configuration of Digital Multifunction Machine 1

The following describes a schematic configuration of a digital multifunction machine 1 according to a first embodiment of the present disclosure based on FIGS. 1 to 3B. FIG. 1 is a perspective view of the exterior of the digital multifunction machine 1 according to the first embodiment of the present disclosure.

Figure 2:
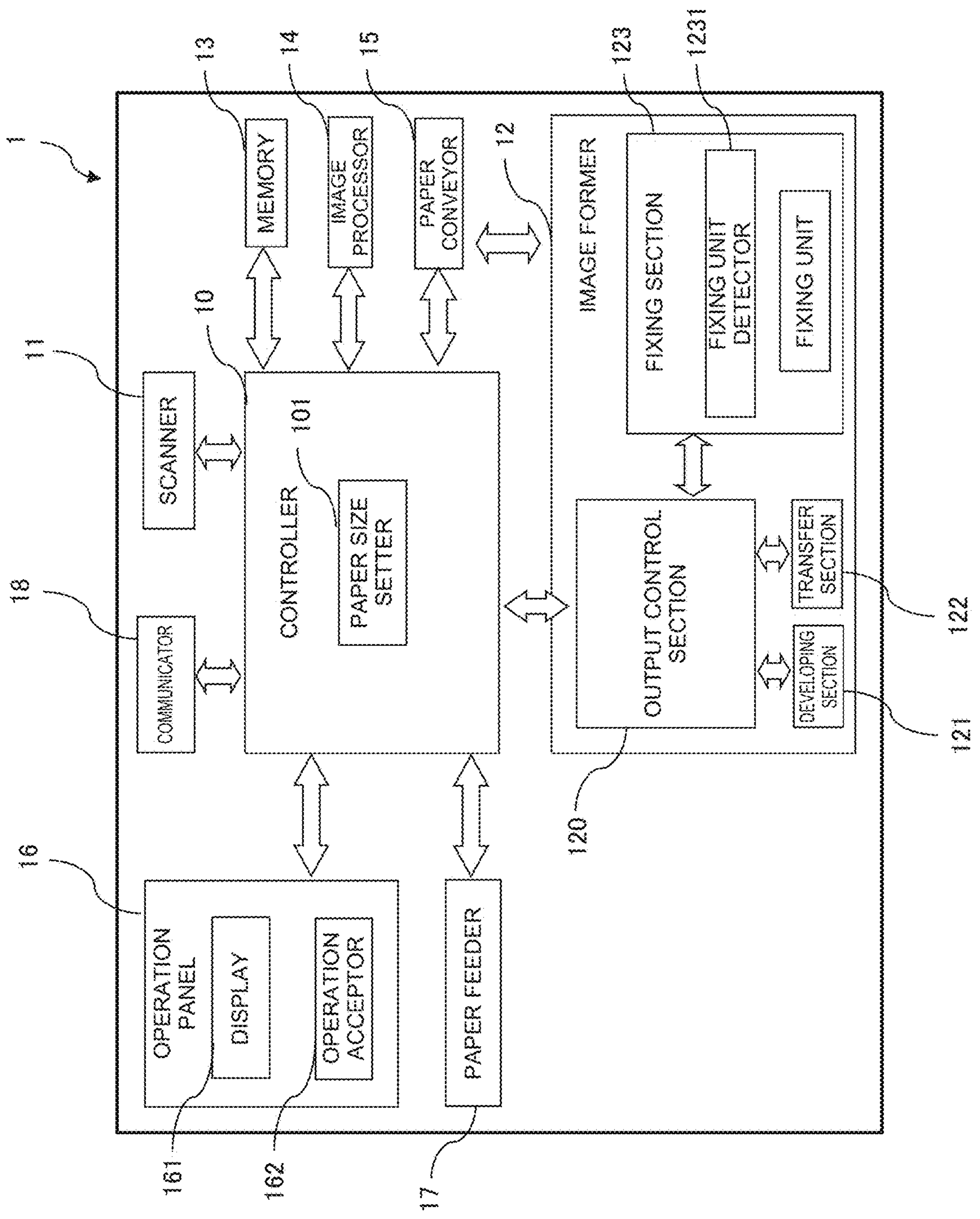
FIG. 2 is a block diagram illustrating a schematic configuration of the digital multifunction machine shown in FIG. 1.

FIG. 2 is a block diagram illustrating a schematic configuration of the digital multifunction machine shown in FIG. 1.

The digital multifunction machine 1 is an apparatus such as an MFP that digitally processes image data acquired from, for example, an external device and has a printer function, a duplicator function, a scanner function, and a facsimile machine function.

The digital multifunction machine 1 executes a job such as a scan job, a print job, a copy job, or an image transmission job based on a command from a user and image data received through an operation panel 16 from an external device, not shown, such as a personal computer via a network, not shown.

Next, the following describes the schematic configuration of the digital multifunction machine 1 based on FIG. 2.

As shown in FIG. 2, the digital multifunction machine 1 includes a controller 10, a scanner 11, an image former 12, memory 13, an image processor 14, a paper conveyor 15, the operation panel 16, a paper feeder 17, and a communicator 18.

The following describes constituent elements of the digital multifunction machine 1.

The controller 10 comprehensively controls the digital multifunction machine 1, and includes, for example, at least one central processing unit (CPU), random access memory (RAM), read only memory (ROM), and various interface circuits.

In order to perform overall control of the operation of the digital multifunction machine 1, the controller 10 monitors and controls detection by sensors, and loads on a motor, a clutch, the operation panel 16, and the like.

The controller 10 performs, for example, drive control of an image-forming engine and management of each job from job reception and storage to completion of printing.

The controller 10 also analyzes data necessary for image formation, such as color designation, the number of copies, and paper size designation, from print data received.

A paper size setter 101 receives a setting of a paper size for paper contained in each tray in the paper feeder 17.

It should be noted that the digital multifunction machine 1 may include a paper size detection sensor 171 to acquire the paper size of the paper contained in each tray at a predetermined timing.

The scanner 11 detects and scans a document placed on a document table, not shown, and generates image data.

Image data may alternatively be obtained from an external device such as a user terminal, not shown, via the communicator 18.

The image former 12 forms and outputs an image onto paper based on image data obtained by the scanner 11 or image data obtained by the communicator 18 from the external device. The image former 12 includes an output control section 120, a developing section 121, a transfer section 122, and a fixing section 123.

The output control section 120 controls the developing section 121, the transfer section 122, and the fixing section 123 to control output such as copying.

The developing section 121 visualizes an electrostatic latent image formed on a photoreceptor drum charged to a predetermined potential by a charger, by suppling a toner to the electrostatic latent image.

The transfer section 122 transfers the toner image thus formed on a surface of the photoreceptor drum onto paper conveyed by the paper conveyor 15.

The fixing section 123 fixes the toner image transferred by the transfer section 122 to the paper by applying pressure and heating thereto.

In the fixing section 123, one of a plurality of types of fixing units corresponding to different paper sizes is mounted in a replaceable manner.

The fixing section 123 includes a fixing unit detector 1231 that detects mounting of the fixing unit and information related to the mounted fixing unit (for example, information such as a paper width that is manageable for printing by the fixing unit).

The memory 13 is an element or a storage medium that stores therein information and control programs necessary to implement various functions of the digital multifunction machine 1. For example, a semiconductor element such as RAM or ROM, or a storage medium such as a hard disk, a flash storage, or a solid state drive (SSD) is used.

It should be noted that programs and data may be retained in different devices. For example, an area for retaining data may be the hard disk drive, and an area for retaining the programs may be the flash storage.

The memory 13 stores, for example, paper size information of paper contained in each tray, the paper width that is manageable for printing by the mounted fixing unit, and print data necessary for image formation such as image data and job information.

The image processor 14 converts image data obtained from a document scanned by the scanner 11 into an appropriate electrical signal to generate image data for image formation, and performs processing, such as scaling up or down, on the image data inputted from the scanner 11 to make the image data suitable for output based on the user's command received by an operation acceptor 162.

The paper conveyor 15 conveys paper contained in any of the trays and a manual feed tray in the paper feeder 17 to the image former 12 via a predetermined conveyance path. The paper conveyor 15 also discharges paper on which an image has been formed by the image former 12 to a paper discharge tray via a predetermined conveyance path.

The operation panel 16 includes a liquid crystal display (LCD), and has a display 161 and the operation acceptor 162.

The display 161 displays various types of information. The display 161 includes, for example, a CRT display, a liquid crystal display, or an EL display, and is a display device such as a monitor or a line display for an operating system or application software to display electronic data on a processing state or the like. The controller 10 displays the operation and the state of the digital multifunction machine 1 through the display 161.

The display 161 displays, for example, a message to the user and information related to each tray.

The operation acceptor 162 includes a touch panel and receives commands from the user.

The paper feeder 17 includes trays into which paper for image formation is loaded, such as paper feed trays and a manual feed tray.

The communicator 18 communicates with an external communication device such as a facsimile machine or an information processing device like a personal computer (PC) or a mobile terminal (for example, a smartphone or a tablet) via USB or the network, not shown, and transmits and receives various types of information such as an e-mail and facsimile to and from the external communication device.

The communicator 18 also receives commands and image data related to image formation from an external device.

Figure 3A:
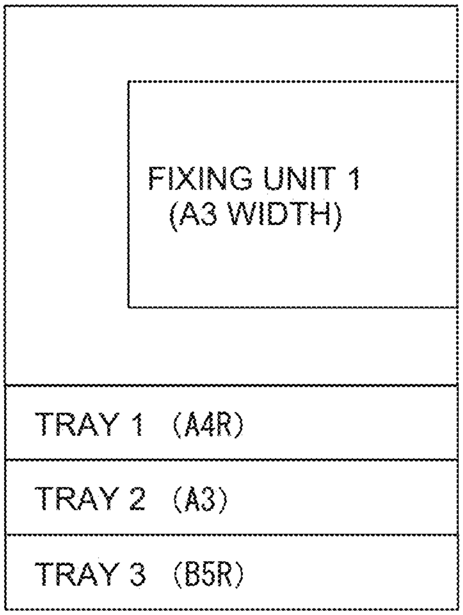
FIGS. 3A and 3B show examples of two different fixing units each mounted in the digital multifunction machine shown in FIG. 1.
Figure 3B:
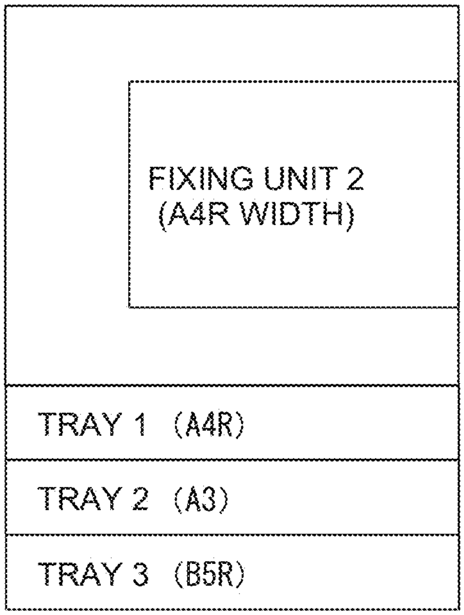

FIGS. 3A and 3B show examples of two different fixing units (Fixing unit 1 and Fixing unit 2) each mounted in the digital multifunction machine 1 shown in FIG. 1.

In the examples shown in FIGS. 3A and 3B, the paper feeder 17 of the digital multifunction machine 1 contains paper feed trays, Tray 1 (A4R), Tray 2 (A3), and Tray 3 (B5R) in the stated order from top to bottom.

In the first embodiment, Fixing unit 1 is exclusively designed for A3 paper and Fixing unit 2 is exclusively designed for A4R paper.

Example of Fixing Unit Replacement Processing in Digital Multifunction Machine 1 According to First Embodiment of Present Disclosure The following describes an example of fixing unit replacement processing in the digital multifunction machine 1 according to the first embodiment of the present disclosure based on FIGS. 4 to 7B.

Figure 4:
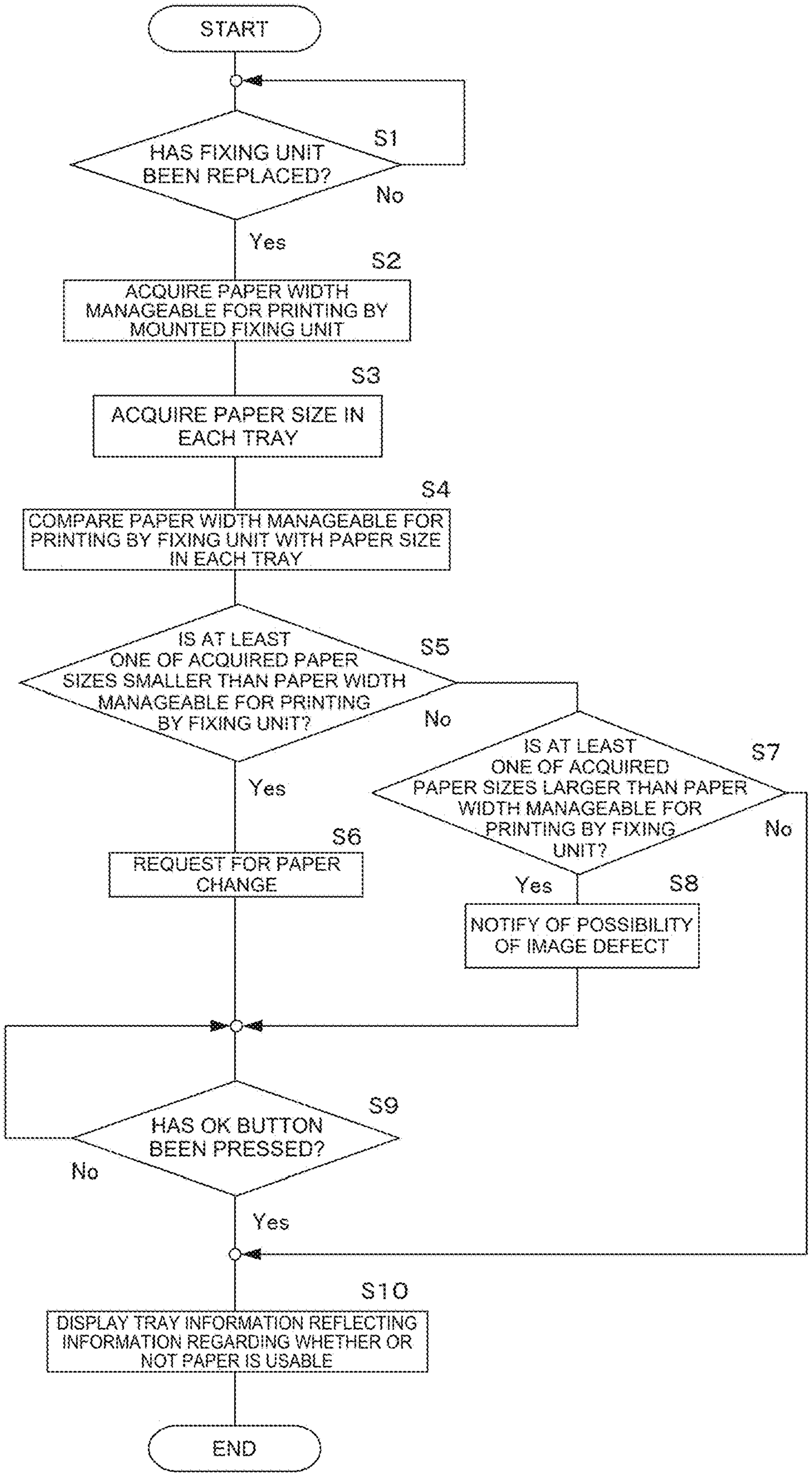
FIG. 4 is a flowchart showing an example of fixing unit replacement processing in the digital multifunction machine shown in FIG. 1.

FIG. 4 is a flowchart showing an example of the fixing unit replacement processing in the digital multifunction machine 1 shown in FIG. 1.

Upon determining that a fixing unit has been replaced in Step S1 in FIG. 4 (if the determination result is Yes in Step S1), the controller 10 advances to Step S2 and acquires a paper width that is manageable for printing by the currently mounted fixing unit (Step S2).

Next, in Step S3, the controller 10 acquires the paper size of paper contained in each tray in the paper feeder 17 (Step S3).

Subsequently, in Step S4, the controller 10 compares the paper width that is manageable for printing by the fixing unit with the paper size of the paper contained in each tray in the paper feeder 17 (Step S4).

Next, in Step S5, the controller 10 determines whether or not at least one of the acquired paper sizes is smaller than the paper width (Step S5).

If at least one of the acquired paper sizes is smaller than the paper width that is manageable for printing by the fixing unit (if the determination result is Yes in Step S5), the controller 10 advances to Step S6 and causes the display 161 to display a message requesting a change of the paper (Step S6).

Subsequently, in Step S9, the controller 10 determines whether or not an OK button displayed on the display 161 has been pressed (Step S9).

If the OK button has been pressed (if the determination result is Yes in Step S9), the controller 10 advances to Step S10 and causes the display 161 to display tray information reflecting information regarding whether or not the paper is usable (Step S10), and then ends the processing.

If none of the acquired paper sizes is determined to be smaller than the paper width that is manageable for printing by the fixing unit in Step S5 (if the determination result is No in Step S5), the controller 10 advances to Step S7 and determines whether or not at least one of the acquired paper sizes is larger than the paper width that is manageable for printing by the fixing unit (Step S7).

If at least one of the acquired paper sizes is larger than the paper width that is manageable for printing by the fixing unit (if the determination result is Yes in Step S7), the controller 10 advances to Step S8 and causes the display 161 to display a message notifying the user of the possibility of an image defect (Step S8). Thereafter, the controller 10 proceeds to the determination in Step S9.

If none of the acquired paper sizes is larger than the paper width that is manageable for printing by the fixing unit (if the determination result is No in Step S7), the controller 10 performs the process in Step S10.

Figure 5:
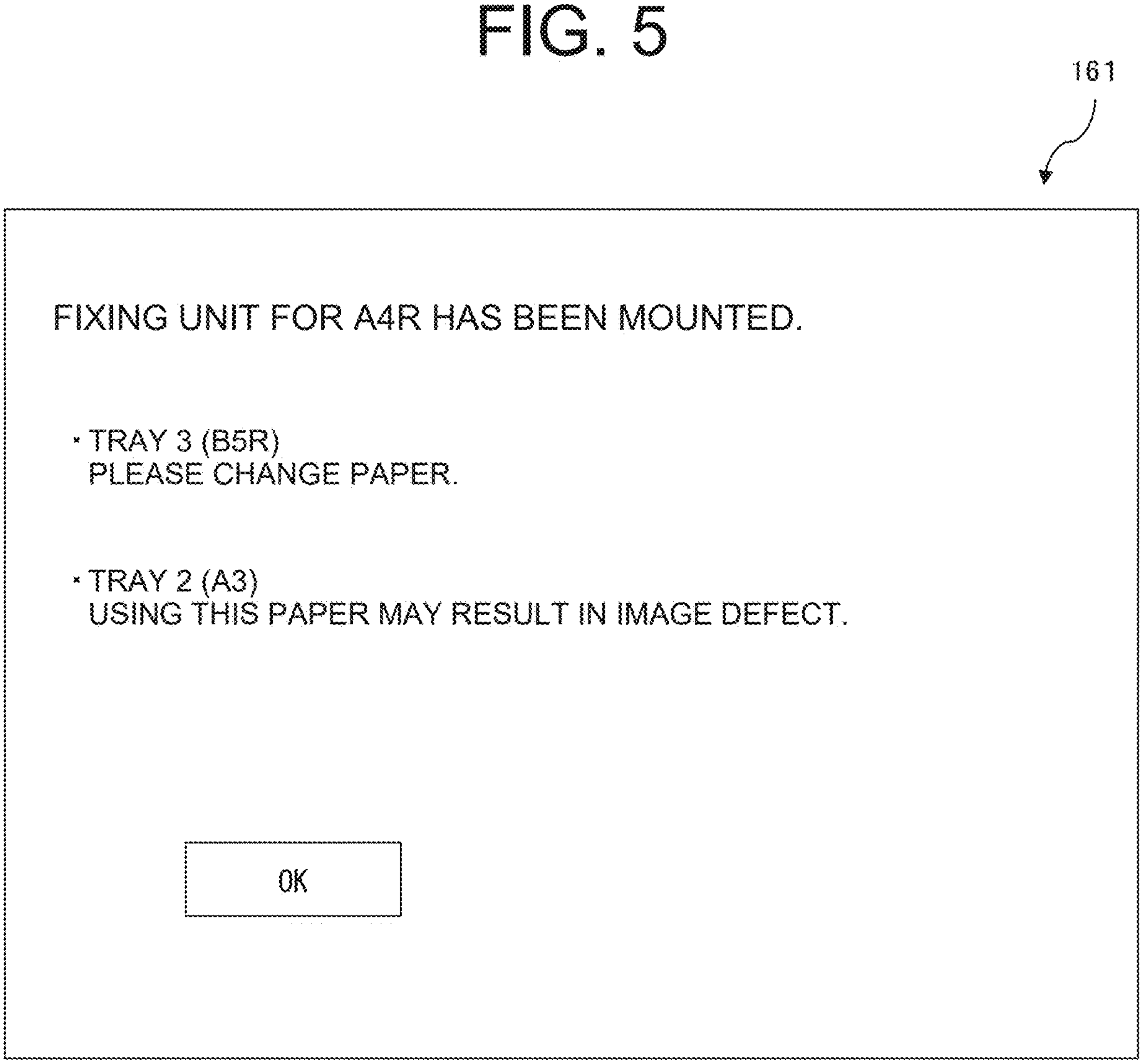
FIG. 5 is an explanatory diagram showing an example of a message displayed on a display of the digital multifunction machine shown in FIG. 1 after a fixing unit has been mounted.

FIG. 5 is an explanatory diagram showing an example of a message displayed on the display 161 of the digital multifunction machine 1 shown in FIG. 1 after a fixing unit has been mounted.

In a case where Fixing unit 2 for A4R paper width is mounted as shown in FIG. 3B, a message "A fixing unit for A4R has been mounted." is displayed on the display 161 as shown in FIG. 5.

Furthermore, a message "Please replace paper." is displayed with respect to Tray 3 containing B5R paper, which has a smaller paper size than A4R paper. Furthermore, a message "Using this paper may result in an image defect." is displayed with respect to Tray 2 containing A3 paper, which has a larger paper size than A4R paper.

Modification Example

As a modification example, the color of an icon for a relevant tray may be changed on a paper feed tray setting screen displayed on the display 161 of the digital multifunction machine 1 as well as displaying a message to draw the user's attention.

Figure 6:
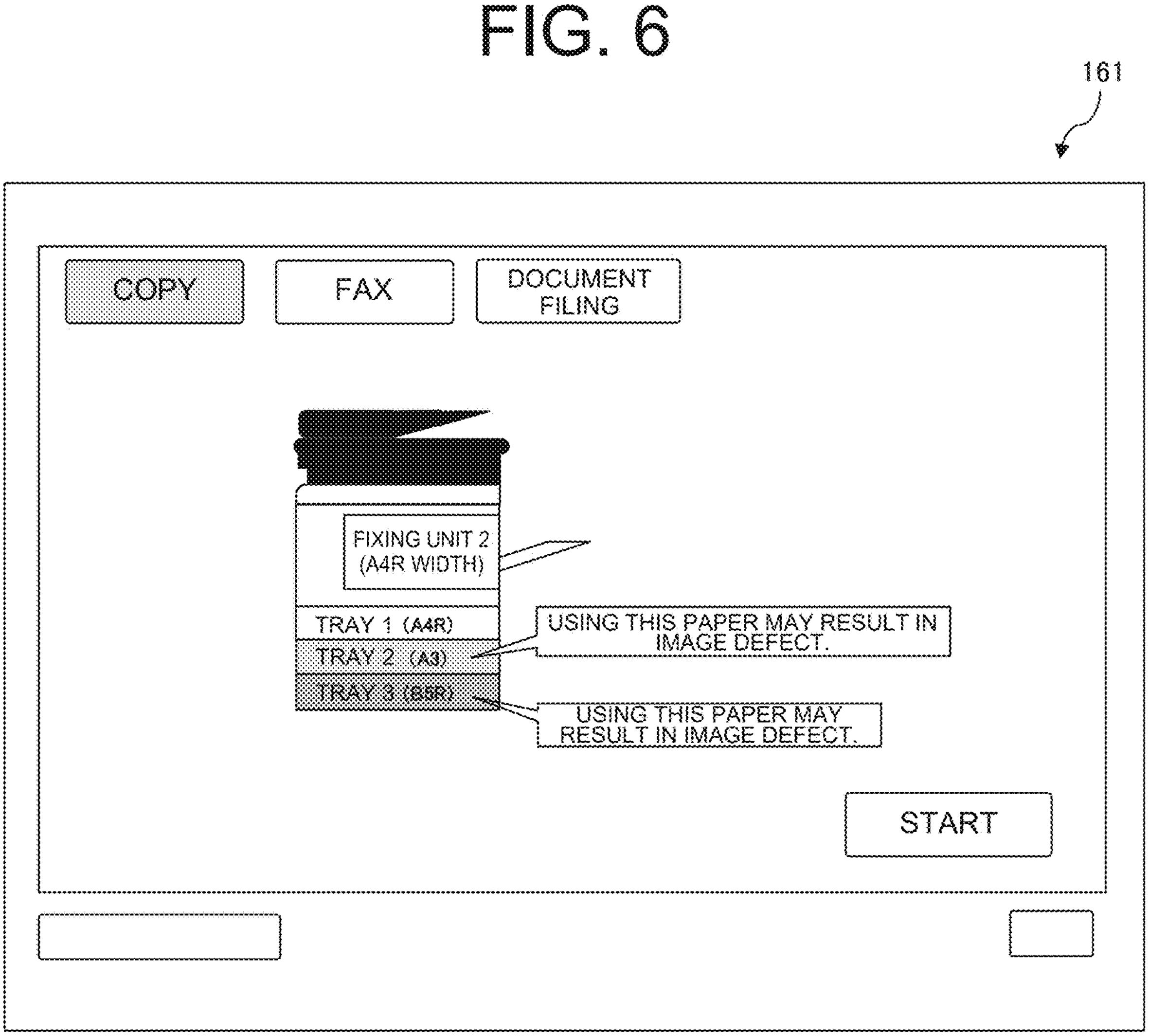
FIG. 6 is an explanatory diagram showing an example of a copy screen displayed on the display of the digital multifunction machine shown in FIG. 1.

FIG. 6 is an explanatory diagram showing an example of a copy screen displayed on the display 161 of the digital multifunction machine 1 shown in FIG. 1.

In FIG. 6, the type of the fixing unit mounted in the fixing section 123 and the type of paper in each tray in the paper feeder 17 are displayed using icons. In this example, the color of the icon for each relevant tray may be changed to draw the user's attention.

In this case, a message may pop up when the user clicks on the icon for such a tray, indicating that the paper needs to be replaced or that using the paper may result in an image defect.

Figure 7A:
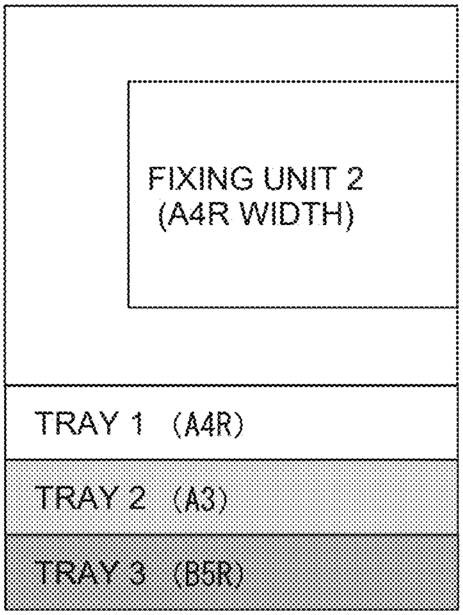
FIGS. 7A and 7B are explanatory diagrams showing an example of a paper size change for paper contained in a tray in a paper feeder of the digital multifunction machine shown in FIG. 1.
Figure 7B:
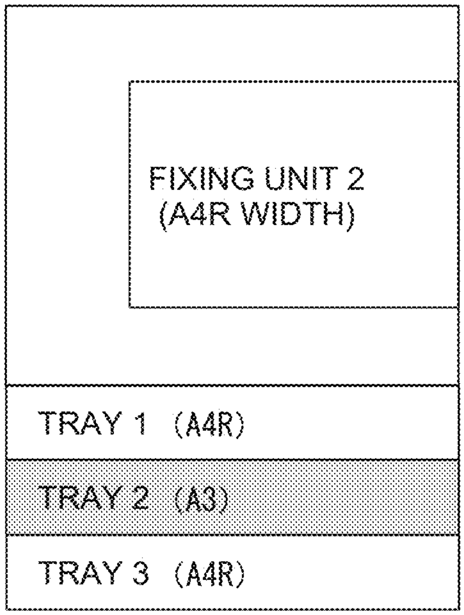

FIGS. 7A and 7B are explanatory diagrams showing an example of a paper size change for paper contained in a tray in the paper feeder 17 of the digital multifunction machine 1 shown in FIG. 1.

FIG. 7A shows a configuration before the paper size change for Tray 3, and FIG. 7B shows a configuration after the paper size change for Tray 3.

The example shown in FIG. 7A is on the assumption that Fixing unit 2 for A4R paper width is mounted in the digital multifunction machine 1 in which Tray 1 contains A4R paper, Tray 2 contains A3 paper, and Tray 3 contains B5R paper.

In this case, the A3 paper contained in Tray 2, which is larger than the acceptable A4R paper width, is manageable for printing, but poses the risk of an image defect. The icon for Tray 2 is therefore displayed in gray as shown in FIG. 7A.

The B5R paper contained in Tray 3, which is smaller than the acceptable A4R paper width, poses the risk of causing scratches on the surface of the fixing roller due to paper sheet edges thereof. The icon for Tray 3 is therefore displayed in a darker shade of gray than that of Tray 2.

Once the user has changed the paper in Tray 3 from B5R paper to A4R paper, the controller 10 stops displaying the icon for Tray 3 in gray as shown in FIG. 7B, so that the user knows that the paper in Tray 3 can be used for printing without the risk of an image defect or edge-induced scratches.

The configuration described above makes it possible to achieve the digital multifunction machine 1 that prevents, following replacement of a fixing unit, scratches on the fixing roller due to paper sheet edges and image defects, which can occur in a case where printing is performed using an inappropriate paper size, more adequately than before.

Second Embodiment

Next, the following describes a digital multifunction machine 1 according to a second embodiment of the present disclosure based on FIGS. 8 to 10B.

As the second embodiment, processes for a user to replace paper will be described.

The digital multifunction machine 1 according to the second embodiment has the same schematic configuration as that of the first embodiment (FIGS. 1 to 3B).

Figure 8:
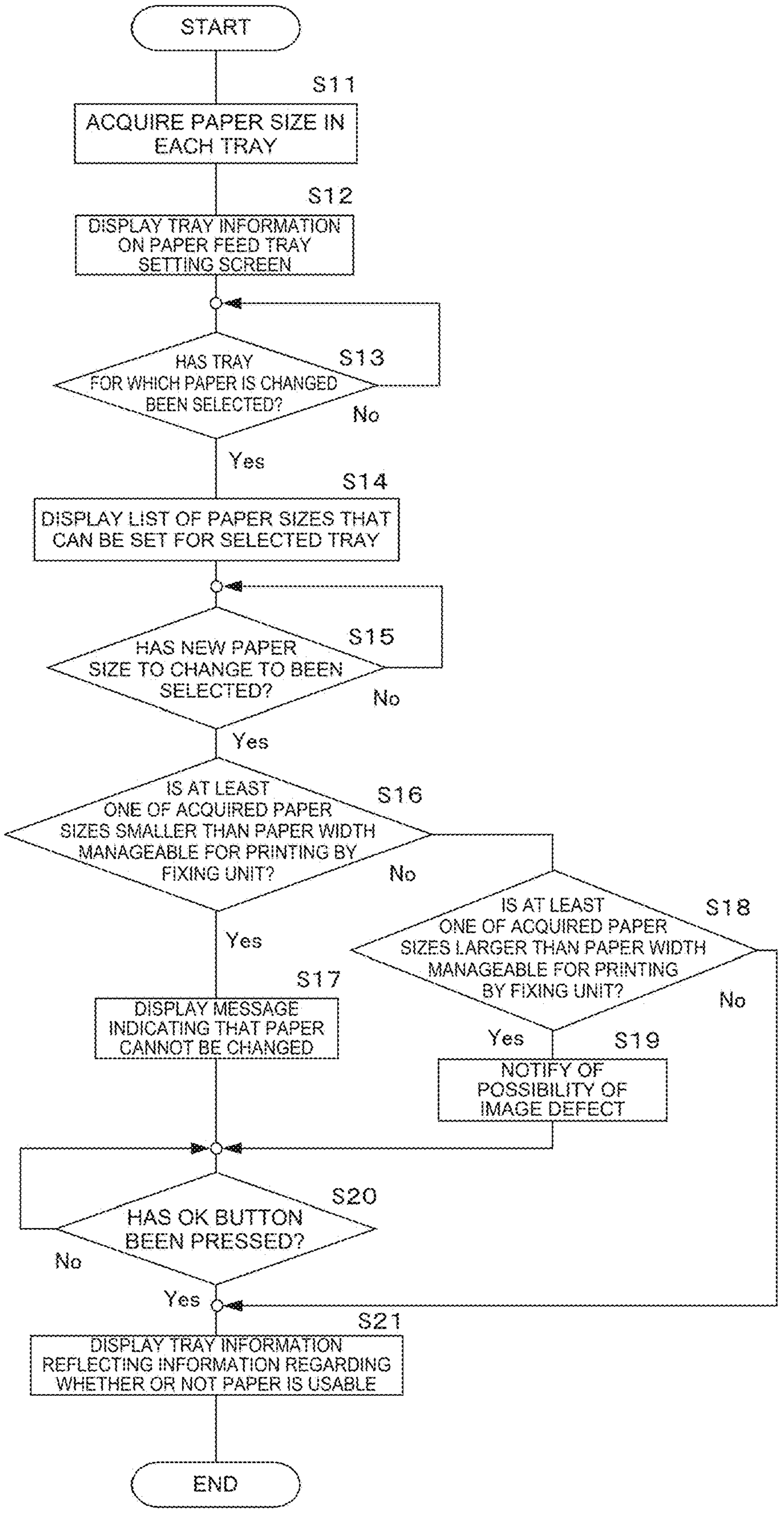
FIG. 8 is a flowchart showing an example of processing for a paper size change for a tray in a paper feeder of a digital multifunction machine according to a second embodiment of the present disclosure.

FIG. 8 is a flowchart showing an example of processing for a paper size change for a tray in the paper feeder 17 of the digital multifunction machine 1 according to the second embodiment of the present disclosure.

FIG. 8 is on the assumption that the user changes the paper size on a paper feed tray setting screen.

In Step S11 in FIG. 8, the controller 10 of the digital multifunction machine 1 acquires the paper size of paper contained in each tray (Step S11).

Next, in Step S12, the controller 10 displays information related to each tray on the paper feed tray setting screen displayed on the display 161 (Step S12).

Subsequently, in Step S13, the controller 10 determines whether or not a tray for which the paper is changed has been selected through the operation acceptor 162 (Step S13).

If a tray for which the paper is changed has been selected (if the determination result is Yes in Step S13), the controller 10 advances to Step S14 and displays a list of paper sizes that can be set for the selected tray (Step S14).

Next, in Step S15, the controller 10 determines whether or not a new paper size to change to has been selected through the operation acceptor 162 (Step S15).

If a new paper size to change to has been selected (if the determination result is Yes in Step S15), the controller 10 advances to Step S16 and determines whether or not the new paper size is smaller than the paper width that is manageable for printing by the fixing unit mounted in the fixing section 123 (Step S16).

If the new paper size is smaller than the paper width that is manageable for printing by the fixing unit (if the determination result is Yes in Step S16), the controller 10 advances to Step S17 and causes the display 161 to display a message indicating that the paper cannot be changed (Step S17).

Subsequently, in Step S20, the controller 10 determines whether or not an OK button displayed on the display 161 has been pressed (Step S20).

If the OK button has been pressed (if the determination result is Yes in Step S20), the controller 10 advances to Step S21 and causes the display 161 to display tray information reflecting information regarding whether or not the paper is usable (Step S21), and then ends the processing.

If the new paper size is not determined to be smaller than the paper width that is manageable for printing by the fixing unit in Step S16 (if the determination result is No in Step S16), the controller 10 advances to Step S18 and determines whether or not the new paper size is larger than the paper width that is manageable for printing by the fixing unit (Step S18).

If the new paper size is larger than the paper width that is manageable for printing by the fixing unit (if the determination result is Yes in Step S18), the controller 10 advances to Step S19 and causes the display 161 to display a message notifying the user of the possibility of an image defect (Step S19). Thereafter, the controller 10 proceeds to the determination in Step S20.

If the new paper size is not larger than the paper width that is manageable for printing by the fixing unit (if the determination result is No in Step S18), the controller 10 performs the process in Step S21.

Figure 9A:
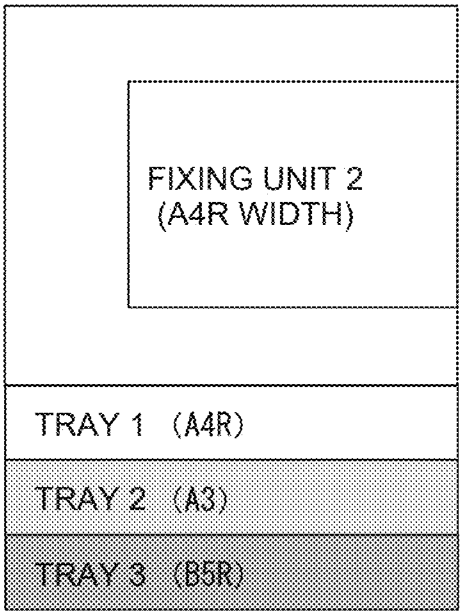
FIGS. 9A and 9B are explanatory diagrams showing an example of a paper size change for paper contained in a tray in the paper feeder of the digital multifunction machine according to the second embodiment of the present disclosure.
Figure 9B:
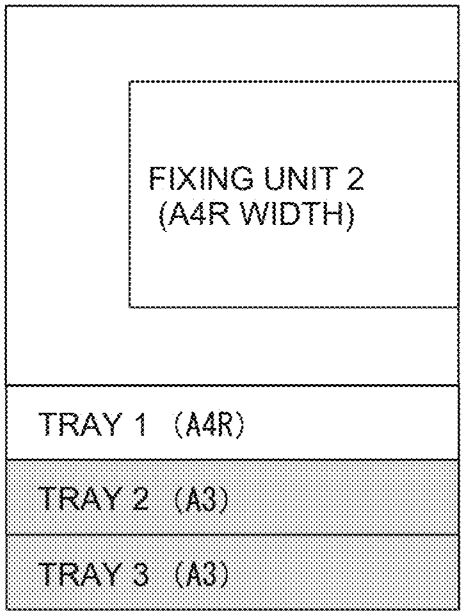

FIGS. 9A and 9B are explanatory diagrams showing an example of a paper size change for paper contained in a tray in the paper feeder 17 of the digital multifunction machine 1 according to the second embodiment of the present disclosure.

FIG. 9A shows a configuration before the paper size change for Tray 3, and FIG. 9B shows a configuration after the paper size change for Tray 3.

The example shown in FIG. 9A is on the assumption that Fixing unit 2 for A4R paper width is mounted in the fixing section 123, and Tray 1 (A4R), Tray 2 (A3), and Tray 3 (B5R) in the paper feeder 17 contain paper of the respective paper sizes.

In this case, considering the relationship with A4R paper width that is manageable for printing by Fixing unit 2, Tray 2 (A3) involves the possibility of an image defect, and the paper in Tray 3 (B5R) needs to be changed.

Suppose here that the user changes the paper size of the paper in Tray 3 from "B5R" to "A3" as shown in FIG. 9B.

Figure 10A:
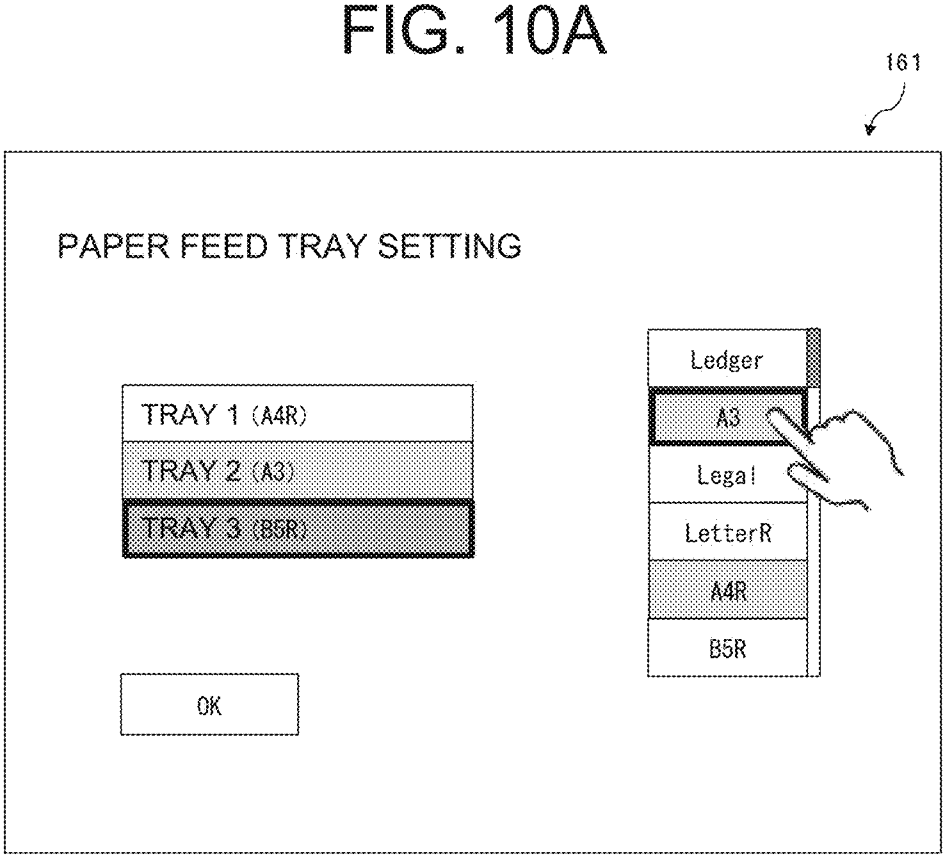
FIGS. 10A and 10B are explanatory diagrams showing an example of a paper size change on a paper feed tray setting screen displayed on a display of the digital multifunction machine according to the second embodiment of the present disclosure.
Figure 10B:
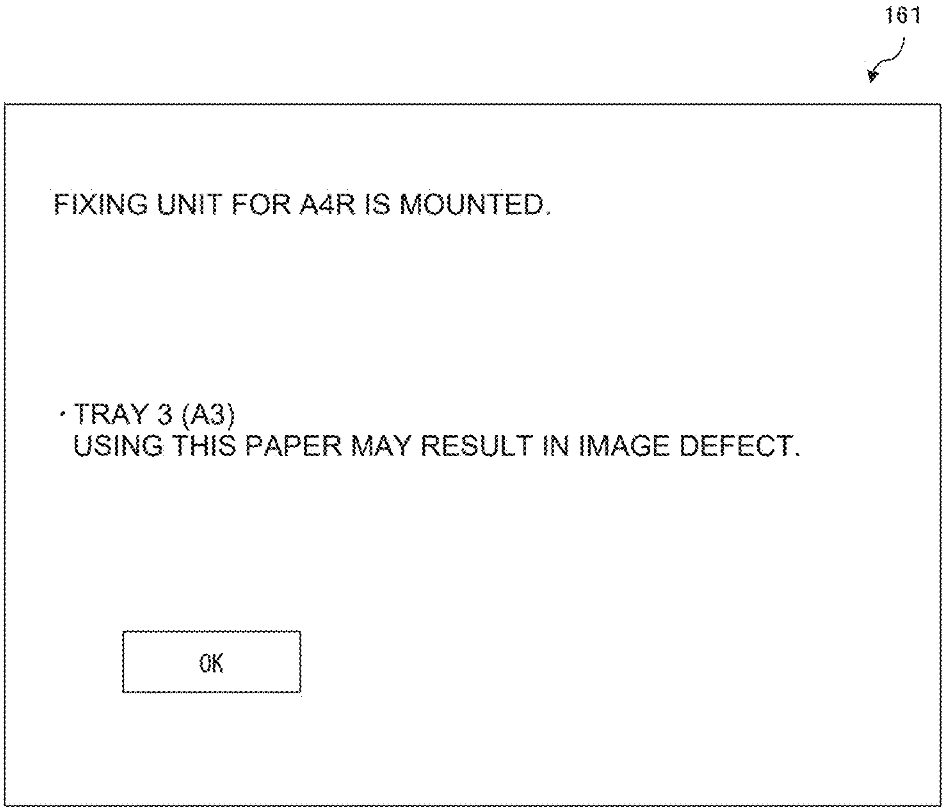

FIGS. 10A and 10B are explanatory diagrams showing an example of a paper size change on the paper feed tray setting screen displayed on the display 161 of the digital multifunction machine 1 according to the second embodiment of the present disclosure.

FIG. 10A shows an example of the paper feed tray setting screen, and FIG. 10B shows an example of confirmation screen messages displayed after the paper size change.

The example shown in FIGS. 10A and 10B is on the assumption that the B5R paper contained in Tray 3 is changed to A3 paper. As shown in FIG. 10A, the paper sizes of Tray 1 (A4R), Tray 2 (A3), and Tray 3 (B5R) are displayed as the current configuration of the paper feeder 17.

In this case, based on the relationship with the paper width that is manageable for printing by the fixing unit, Tray 2 (A3) is displayed in light gray indicating the possibility of an image defect, and Tray 3 (B5R) is displayed in dark gray indicating that the paper contained therein needs to be changed.

Furthermore, a list of selectable paper sizes is displayed in a scrollable manner on the right side of the paper feed tray setting screen.

This paper size list is also based on the relationship with the paper width that is manageable for printing by the fixing unit, and each relevant paper size is displayed in light gray indicating the possibility of an image defect or in dark gray indicating that the paper needs to be changed.

Upon the user selecting the "A3" paper size from the list and pressing the "OK" button on this screen, a confirmation screen shown in FIG. 10B is displayed on the display 161.

In the example shown in FIG. 10B, a message "Using this paper may result in an image defect." is displayed with respect to Tray 3 for which the paper size has been changed to "A3" along with a message "A fixing unit for A4R is mounted.".

The configuration described above makes it possible to achieve the digital multifunction machine 1 that prevents, also following a paper size change in the paper feeder 17, scratches on the fixing roller due to paper sheet edges and image defects, which can occur in a case where printing is performed using an inappropriate paper size, more adequately than before.

Preferred embodiments of the present disclosure include any combination of the plurality of embodiments described above.

In addition to the embodiments described above, the present disclosure may include various modifications thereof. Such modifications should not be construed as falling outside the scope of the present disclosure. The present disclosure includes all variations that are equivalent in meaning and scope to the claims.

What is claimed is:

1. An image forming apparatus comprising:

an image former that forms an image on paper by heating and fixing a toner onto the paper using a replaceable fixing unit detachably mounted therein, the image former including a fixing unit detector that detects mounting of the fixing unit and a paper width that is manageable for printing by the fixing unit;

a paper feeder including a plurality of trays into which paper of predetermined different paper sizes are loaded;

a paper size setter that receives a setting of the paper size for the paper contained in each of the plurality of trays;

a display that displays various types of information to a user; and one or more controllers that control the image former, the paper feeder, the paper size setter, and the display, wherein upon the fixing unit detector detecting the mounting of the fixing unit, the controllers acquire a paper width that is manageable for printing by the fixing unit and compare the acquired paper width with the paper sizes of the paper contained in the plurality of trays received by the paper size setter, and if at least one of the plurality of trays contains paper of a paper size that is not suitable for printing by the fixing unit, cause the display to display a message or an indication indicating this issue.

2. The image forming apparatus according to claim 1, wherein if at least one of the plurality of trays contains paper of a paper size smaller than the paper width that is manageable for printing by the fixing unit, the controllers cause the display to display a message or an indication requesting a change of the paper in the at least one tray.

3. The image forming apparatus according to claim 1, wherein if at least one of the plurality of trays contains paper of a paper size larger than the paper width that is manageable for printing by the fixing unit, the controllers cause the display to display a message or an indication indicating the possibility of an image defect occurring in image formation on the paper contained in the at least one tray.

4. The image forming apparatus according to claim 1, wherein upon the paper size setter receiving a setting to change the paper size of the paper contained in one of the plurality of trays, the controllers acquire the paper width that is manageable for printing by the fixing unit and compare the acquired paper width with a new paper size to change to, and if the new paper size is not suitable for printing by the fixing unit, cause the display to display a message or an indication indicating this issue.

5. The image forming apparatus according to claim 4, wherein if the new paper size is smaller than the paper width that is manageable for printing by the fixing unit, the controllers cause the display to display a message or an indication indicating that the paper size is not changeable to the new paper size.

6. The image forming apparatus according to claim 4, wherein if the new paper size is larger than the paper width that is manageable for printing by the fixing unit, the controllers cause the display to display a message or an indication indicating the possibility of an image defect occurring in image formation on the paper of the new paper size.

* * * * *